United States Patent [19]
Sidlauskas et al.

[11] Patent Number: 6,133,833
[45] Date of Patent: Oct. 17, 2000

[54] WIRELESS ADD-ON KEYBOARD SYSTEM AND METHOD

[75] Inventors: Tom Sidlauskas, Cupertino; Frederick A. Nylander, Morgan Hill; Stephen Joseph Rose, Fremont, all of Calif.

[73] Assignee: Motorola, Inc., Schaumburg, Ill.

[21] Appl. No.: 09/257,663

[22] Filed: Feb. 25, 1999

[51] Int. Cl.[7] .................................................. G08B 13/14
[52] U.S. Cl. .................... 340/572.1; 340/825.56; 341/20; 341/22; 341/26; 341/173; 345/168; 345/172
[58] Field of Search ........................ 340/572.1, 572.5, 340/572.8, 825.56, 825.57, 825.69, 825.71, 825.72, 10.1–10.6, 10.33, 10.34; 341/22, 20, 26, 173; 345/168, 169, 172

[56] References Cited

U.S. PATENT DOCUMENTS

| | | | |
|---|---|---|---|
| 5,009,227 | 4/1991 | Nieuwstad | 128/207.17 |
| 5,406,273 | 4/1995 | Nishida et al. | 340/825.51 |
| 5,859,599 | 1/1999 | Shiga | 341/21 |
| 5,861,822 | 1/1999 | Park et al. | 341/22 |
| 5,870,033 | 2/1999 | Strolo | 341/22 |
| 5,920,308 | 7/1999 | Kim | 345/169 |
| 5,925,110 | 7/1999 | Klein | 710/15 |
| 5,949,335 | 9/1999 | Maynard | 340/572.1 |
| 5,955,975 | 9/1999 | Frederick et al. | 341/22 |
| 5,977,886 | 11/1999 | Barile et al. | 341/20 |

*Primary Examiner*—Nina Tong
*Attorney, Agent, or Firm*—Terri S. Hughes

[57] ABSTRACT

A wireless keyboard or keypad (22) is powered remotely by a radio frequency exciter/receiver (20) and used in a radio frequency identification system (10). The wireless keyboard and the exciter/receiver communicate without wires via electrostatic or electromagnetic radiation. No power source is integrated with the wireless keypad. Thus, the wireless keypad is readily added to, or retrofit into, an existing radio frequency identification system. The keyboard has a plurality of keys (24) or control members that are manually actuated. Depression of a key or button, or other actuation of a control member, causes a predetermined response signal associated with that key to be generated. The response signal relates to an operation for a device or system associated with the exciter/receiver.

25 Claims, 6 Drawing Sheets

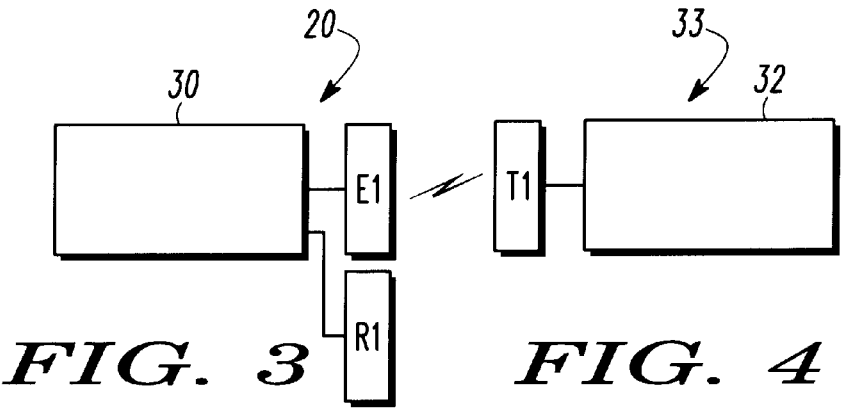
FIG. 3   FIG. 4
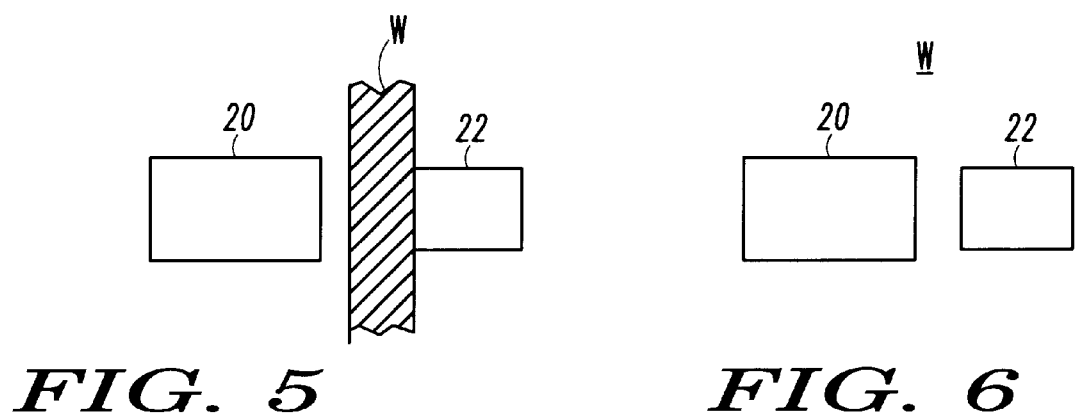
FIG. 5   FIG. 6

WIRELESS ADD-ON KEYBOARD SYSTEM AND METHOD

CROSS REFERENCE TO RELATED APPLICATIONS

The present invention is related to, a commonly assigned prior application by Theodore D. Geiszler et al., entitled "Remotely Powered Electronic Tag with Plural Electrostatic Antennas and Associated Exciter/Reader and Related Method; Radio Frequency Identification Tag System Using Tags Arranged for Coupling to Ground; Radio Frequency Identification Tag Arranged for Magnetically Storing Tag State Information; and Radio Frequency Identification Tag with a Programmable Circuit State," application Ser. No. 09/061,146, filed Apr. 16, 1998, now pending.

The present invention is also related to, a commonly assigned application by Sean Loving, entitled "Passive Remote Control System," application Ser. No. 09/257,315, filed on an even date herewith, now pending.

FIELD OF THE INVENTION

The present invention relates generally to passive remote control devices, portable remotely powered communication devices, and communication devices that employ electrostatic or electromagnetic coupling. More particularly, the invention relates to radio frequency identification (RFID) units in combination with a remotely located keyboard or keypad.

BACKGROUND OF THE INVENTION

Remotely powered electronic devices and related systems for supplying power to and receiving stored information from such devices are known. For example, U.S. Pat. No. 5,009,227 issued to Geiszler et al., entitled Proximity Detecting Apparatus, discloses a remotely powered device that uses electromagnetic coupling to derive power from a remote source and then uses both electromagnetic and electrostatic coupling to transmit stored data to a receiver often collocated with the remote source. These systems are also known as radio frequency identification ("RFID") systems. Such RFID systems are usable in numerous applications, including, for example, in inventory control, livestock control, and sentry systems. Additionally, radio frequency identification tags are used in electronic article surveillance ("EAS") systems, such as those used at exits in retail establishments where merchandise is sold.

Typically, RFID systems include an integrated exciter/receiver and RFID tags. The exciter/receiver generates an excitation field and detects or receives a response field. The RFID tags are remotely powered by the excitation field and produce the response field. Some RFID systems include a keyboard or keypad that is hardwired to an exciter/receiver. The keypad is used, for example, to enter a code to permit entry to a secure area. Use of a keypad advantageously expands the capability and flexibility of the RFID system.

Unfortunately, hardwired keypads or keyboards require modification to an exciter/receiver for use therewith or design of an exciter/receiver specifically for attachment to a hardwired keyboard. This is an obvious disadvantage, particularly where it is desirable to add the keyboard to an existing RFID system.

Therefore, a need exists for a keyboard that is readily adapted to or retrofit with an exciter/receiver of an RFID system without adding wires to the system.

BRIEF DESCRIPTION OF THE DRAWINGS

FIG. 3 is a block diagram illustrating an exciter/receiver of a radio frequency identification system in accordance with the present invention.

FIG. 4 is a block diagram of a communication device portion of a wireless keyboard in accordance with the present invention.

FIG. 5 is a schematic illustration, partially in section, showing the relative positions of an exciter/receiver and wireless keyboard in accordance with a preferred embodiment of the present invention.

FIG. 6 is a schematic illustration showing relative positions for an alternate preferred embodiment of an exciter/receiver and wireless keyboard in accordance with the present invention.

DETAILED DESCRIPTION OF THE PREFERRED EMBODIMENTS

Briefly, a radio frequency identification system with a wireless keyboard or keypad (used interchangeably herein) according to the invention includes an exciter/receiver and a keyboard. The exciter/receiver produces an excitation field via electrostatic radiation or electromagnetic radiation or both of these. The excitation field powers the keyboard. The keyboard includes a manually actuated element that when actuated causes the keyboard to produce a response signal or field. The response signal is detected by the exciter/receiver and decoded. The wireless keyboard is preferably affixed in a location in proximity to the exciter/receiver such that electrostatic or electromagnetic communication occurs. Since the wireless keyboard need not be physically connected or wired to the exciter/receiver and does not require an independent power source, the wireless keypad is readily added to, or retrofit with, an existing radio frequency identification system that includes an exciter/receiver.

Figure 1:
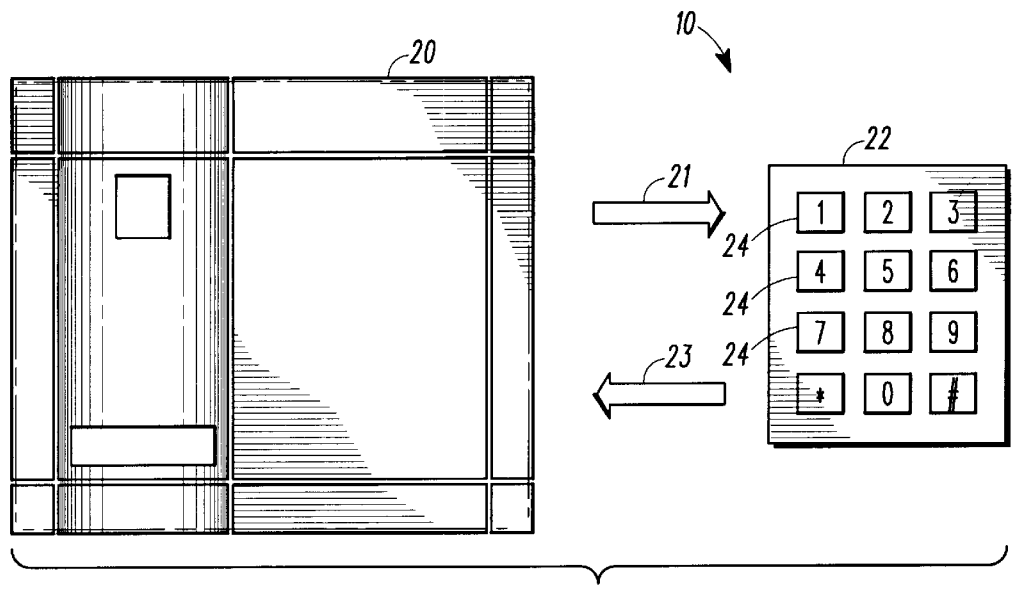
FIG. 1 is a schematic diagram of a radio frequency identification system with a wireless keyboard in accordance with a preferred embodiment of the present invention.

FIG. 1 schematically shows a radio frequency identification system 10 in accordance with the present invention. The system 10 includes an exciter/receiver 20 and a keyboard 22. Exciter/receiver 20 is in signal communication with keyboard 22 over the air, as represented by arrows 21, 23. Keyboard 22 controls the operations or functions of a device or system (not shown) associated with exciter/receiver 20. The device or system associated with exciter/receiver 20 is preferably a sentry or security system and is alternatively any other system, for example, a system for identification or tracking of persons or things.

Exciter/receiver 20 is commonly referred to as a radio frequency identification reader or simply a reader. Exciter/receiver 20 generates an excitation field via electrostatic radiation, electromagnetic radiation or both of these. Exciter/receiver 20 also detects or receives electrostatic or electromagnetic radiation or both. Though commonly integrated, the exciter function, i.e., generation of an excitation field, is alternatively separate from the receiver/reader function, i.e., detection of a response signal.

Keyboard 22 has a plurality of keys 24. Keys 24 are preferably switches. Keys 24 are shown as numeric buttons or keys and are alternatively alphabetic, alphanumeric or any other designation. Keys 24 are manually actuated, for example, by depressing. In accordance with the invention, the response signal generated by keyboard 22 is determined in part by the key 24 actuated.

Figure 2:
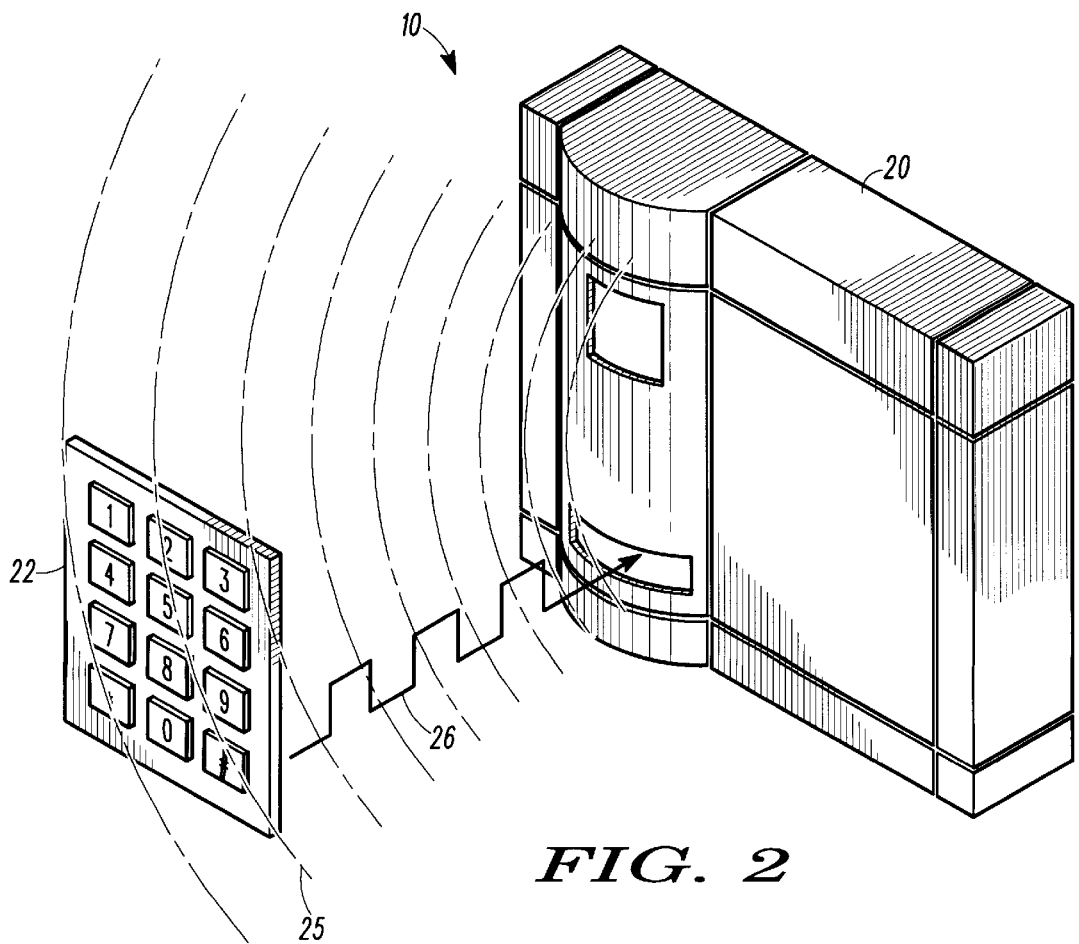
FIG. 2 shows schematically the transmission of an excitation signal and a response signal in the radio frequency identification system of FIG. 1.

FIG. 2 shows exciter/receiver 20 in proximity to keyboard 22. An excitation field 25 is shown emanating from exciter/receiver 20. Keyboard 22 is shown generating a response signal 26 that is received by exciter/receiver 20. Preferably, excitation field 25 has a frequency of 125 KHz and response signal 26 has a frequency of 62.5 KHz. Most preferably, response signal 26 is an amplitude-modulated version of excitation field 25.

FIG. 3 and FIG. 4 show block diagrams, respectively, of an exciter/receiver 20 and a communication device portion 33 of keyboard 22. Exciter/receiver 20 includes an exciter/receiver circuit 30 coupled to an exciter antenna element E1 and a receiver antenna element R1. Exciter/receiver circuit 30 includes a circuit for generating and driving an excitation signal into exciter antenna element E1. Exciter/receiver 20 also includes a circuit for receiving and decoding a response signal received by receiver antenna element R1. Suitable exciter/receivers are known and also disclosed in the aforementioned related patent applications, which are incorporated by reference.

Exciter antenna element E1 and receiver antenna element R1 are both shown as one antenna element for illustration purposes. Exciter antenna element E1 is either an electrostatic antenna or an electromagnetic antenna or a combination of these. Receiver antenna element R1 is either an electrostatic antenna or an electromagnetic antenna or a combination of these. In the case where exciter/receiver 20 generates an electrostatic field, antenna element E1 is preferably a metal electrode antenna, a metallized label, or other structure usable as an electrostatic antenna. In the case where exciter/receiver 20 generates an electromagnetic field, antenna element E1 is preferably a coil of wire or metal-on-film printed coil, or other coil structure usable as an electromagnetic antenna. In the case where exciter/receiver 20 detects an electrostatic field, antenna element R1 is preferably a metal electrode antenna, a metallized label, or other structure usable as an electrostatic antenna. In the case where exciter/receiver 20 detects an electromagnetic field, antenna element R1 is preferably a coil of wire or metal-on-film printed coil, or other coil structure usable as an electromagnetic antenna. The locations of exciter antenna element E1 and receiver antenna element R1 vary including on the exterior of exciter/receiver 20 or within the interior of exciter/receiver 20. The shape, size, configuration and number of antenna elements of antenna element E1 and antenna element R1 vary depending on the application.

Communication device portion 33 of keyboard 22, shown in FIG. 4, includes a radio frequency identification circuit 32 and antenna T1. Radio frequency identification circuit 32 is operably coupled to antenna T1. Radio frequency identification circuit 32, in conjunction with antenna T1, detects an excitation field or signal and then rectifies that signal into a power source for the radio frequency identification circuit. Radio frequency identification circuit 32 generates a response signal after it has power. Radio frequency identification circuit 32 is also coupled to the plurality of keys of keyboard 22, as discussed below.

In the case where communication device portion 33 detects an electrostatic excitation field and generates an electrostatic response signal, antenna T1 is preferably a metal electrode antenna, a metallized label, or other structure usable as an electrostatic antenna. In the case where communication device portion 33 detects an electromagnetic excitation field and generates an electromagnetic response signal, antenna T1 is preferably a coil of wire or metal-on-film printed coil, or other coil structure usable as an electromagnetic antenna. The location of antenna T1 varies including on the exterior of keyboard 22 or within the interior of keyboard 22. Also, the shape size, configuration and number of antenna elements of antenna T1 vary depending on the application.

Radio frequency identification circuit 32 comprises the electronics necessary to convert the electromagnetic or electrostatic radiation into a power source, decode the excitation signal if necessary and respond to the excitation signal with an appropriate response signal. In accordance with the present invention, the response signal is determined in part by the key or button depressed on keyboard 22. Exciter/receiver 20 detects or receives the response signal and in accordance with a predetermined scheme, determines which key, if any, is actuated. Then, based on the key actuated, exciter/receiver 20 communicates a corresponding operation to the associated system. The interface between radio frequency identification circuit 32 and the plurality of keys is discussed further below with respect to FIGS. 7–10.

FIG. 5 and FIG. 6 show spatial relationships between exciter/receiver 20 and keyboard 22. In FIG. 5 a wall W is shown separating exciter/receiver 20 from keyboard 22. More specifically, keyboard 22 is shown affixed to wall W and exciter/receiver 20 is located near an opposite side of wall W. This configuration is advantageous in numerous applications, including where it is desirable to keep the exciter/receiver secluded from the keyboard. This prevents access to the exciter/receiver by a person using the keyboard for entry into a secured area. This provides an additional measure of security for the exciter/receiver system and hence, the entryway. In FIG. 6, keyboard 22 and exciter/receiver 20 are mounted adjacent or near each other on the same side of wall W. Other configurations and relationships between keyboard 22 and exciter/receiver 20 are possible in accordance with the present invention. Of course, the keyboard 22 must be located as to be in signal communication with exciter/receiver 20. Also, the exciter function may be located separate from the receiver function.

In operation an excitation signal is produced by exciter/receiver 20 at a predetermined frequency. Typically this frequency is 125 KHz. The keyboard 22 detects the excitation signal and causes radio frequency identification circuit 36 to power up. When one of the keys on keyboard 22 is depressed, a response signal is generated by radio frequency identification circuit 32 and radiated by antenna T1. In this manner, keyboard 22 serves as an electrostatic or electromagnetic wireless input device when a key is depressed. The response signal from the keyboard 22 is preferably a modulation of the excitation signal, for example, at a frequency of 62.5 KHz. Most preferably, the response signal is a pulse code modulation of the excitation signal at 62.5 KHz. According to the invention, a predetermined code is generated for each key or button depressed. Thus, upon receiving and decoding the response signal, the exciter/receiver 20 determines the operation that should be performed.

Figure 7:
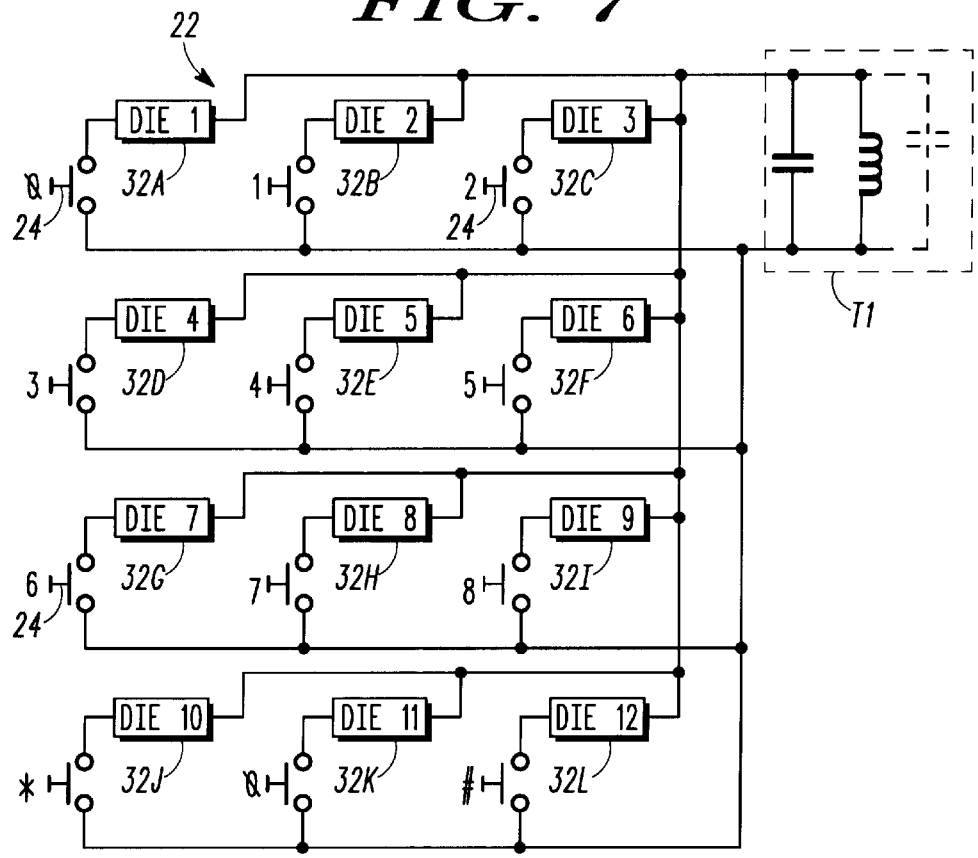
FIG. 7 is a schematic diagram of a preferred embodiment of a wireless keyboard in accordance with the present invention, wherein the wireless keyboard includes a plurality of radio frequency identification circuits for interfacing with the keyboard.

FIG. 7 is a schematic diagram of keyboard 22 showing the coupling between the buttons or keys 24 of keyboard 22 with radio frequency identification circuits 32A-L and antenna T1. In this preferred arrangement, a plurality of radio frequency identification circuits are provided, a circuit for each key or button. Antenna T1 is shown as both an electromagnetic and electrostatic antenna with the electrostatic antenna shown in phantom.

Each radio frequency identification circuit 32A-L has one direct or wired connection to antenna T1. The other connection to antenna T1 is via the key associated with the radio frequency identification circuit. More specifically, the key must be depressed to connect the radio frequency identification circuit to antenna T1 in a manner to allow the radio frequency identification circuit to power up and respond to an excitation signal. In other words, an open circuit between the radio frequency identification circuit and antenna is provided and closed only when the key is depressed.

Radio frequency identification circuits 32A-L each contain a code storing circuit that determines the response code sent by the remote control device. The code storing circuit is preferably a ROM or RAM, but any suitable memory device is alternatively used.

Figure 8:
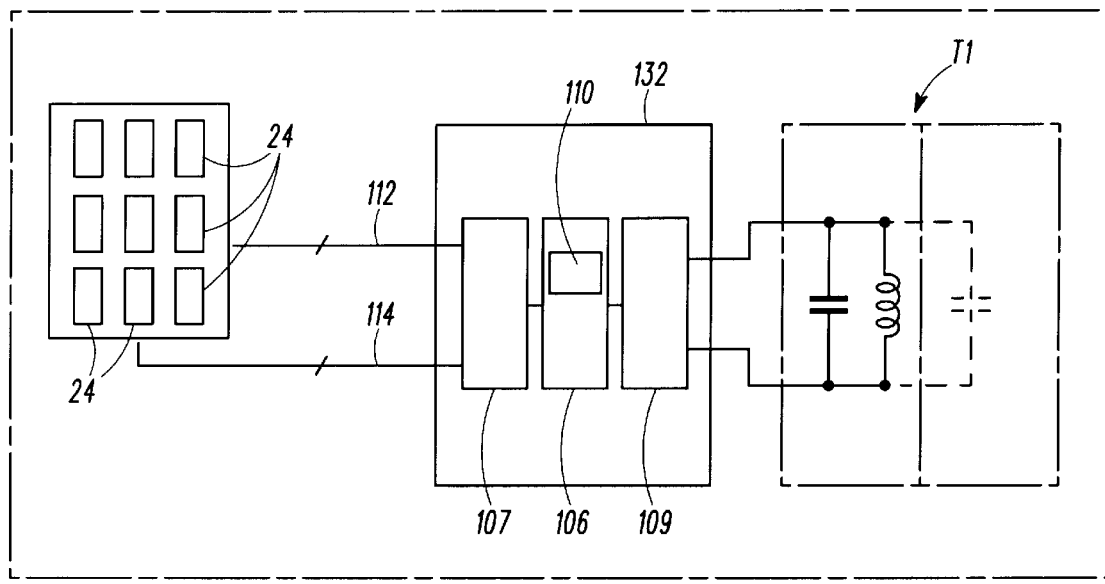
FIG. 8 is a block diagram illustrating a wireless keyboard in accordance with the present invention, wherein the wireless keyboard includes a single radio frequency identification circuit for interfacing with the keyboard.

FIG. 8 shows an alternate preferred embodiment of keyboard 22 wherein rather than having a radio frequency identification circuit per key, a single radio frequency circuit 132 is provided. The buttons or keys 24 have a plurality of wires 112,114 that interface to radio frequency identification circuit 132. Radio frequency identification circuit 132 is directly connected or wired to antenna T1, shown as an electrostatic and electromagnetic antenna with the electrostatic portion shown in phantom.

Radio frequency identification circuit 132 includes a keypad decoder 107, control logic 106 and a modulator 109. Keypad decoder 107 interfaces with the plurality of wires 112, 114 or lines from the keys 24. Preferably the keys have a row and column selection and the lines 112 represent the column while the lines 114 represent the row. The row and column are decoded within decoder 107 to determine which key is depressed. Of course, there are alternate arrangements for determining which key is depressed and interfacing the keys to the circuit, including having a line associated with each key.

After decoder 107 determines which key is depressed, control logic 106 determines a modulation to apply. Preferably, control logic 106 includes a code storing circuit 110 that stores a predetermined code for each key. The code determines the predetermined modulation to apply. The code storing circuit is preferably a ROM or RAM, but any suitable memory is alternatively used. Control logic 106 is preferably implemented as a microprocessor, sequential or combinatorial logic or a combination of these. Modulator 109 applies the modulation determined by control logic 106 to antenna T1 so that a predetermined response signal is radiated by antenna T1. The exciter/receiver detects this response signal as described previously herein.

Figure 9:
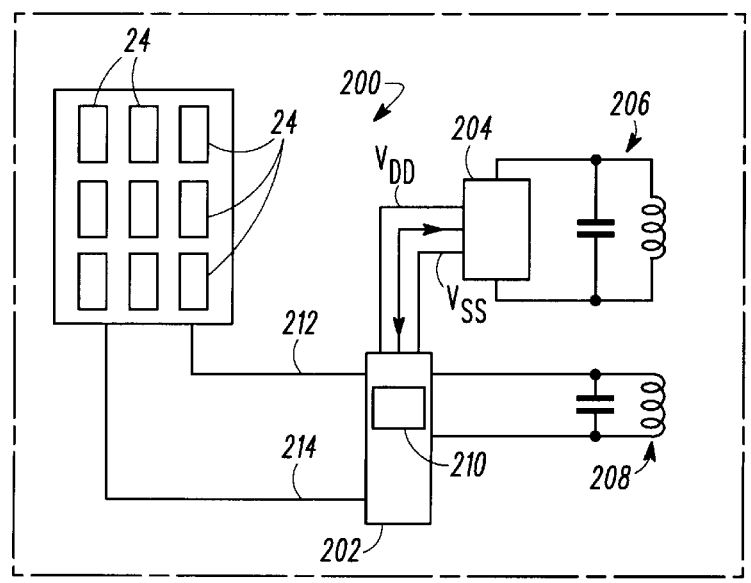
FIG. 9 is a block diagram of an alternate preferred embodiment of a wireless keyboard in accordance with the present invention, wherein the keyboard includes a programming antenna and a programmable circuit.

FIG. 9 is a block diagram illustrating an alternate preferred embodiment of a wireless keyboard 200, wherein the keyboard includes a separate interface for programming the responses generated by the keys. Wireless keyboard 200 includes a plurality of keys 24, a programmable decoder 202, a radio frequency identification circuit 204, a main antenna 206 and a programming antenna 208. The plurality of keys 24 are operably coupled to programmable decoder 202 via wires 212, 214. Wires 212, 214 preferably include a row and column, respectively, and in combination determine which key among the plurality of keys is depressed. Programmable decoder 202 decodes the key depressed and interfaces with radio frequency identification circuit 204 to determine a modulation to apply for a response signal. Radio frequency identification circuit 204 is coupled to antenna 206 to receive an excitation signal from an exciter/receiver and generate a response signal. Radio frequency identification circuit 204 preferably provides power Vdd, Vss to programmable decoder 202. Programmable antenna 208 receives a radio frequency programming signal that is used to program programmable decoder 202 to determine a modulation to be produced as a result of a key being depressed.

Programmable decoder 202 is preferably a microprocessor, sequential or combinatorial logic or a combination of these. Most preferably, programmable decoder 202 includes a code storing circuit 210, which is a preferably a RAM or other programmable memory, and code storing circuit 210 is altered as a result of receiving a programming signal on programming antenna 208.

Though shown as separate blocks in FIG. 9, programmable decoder 202 and radio frequency identification circuit 204 are alternatively integrated on the same die or chip. Also, a radio frequency programming signal on programming antenna 208 is alternatively used to power programmable decoder 202 for programming. If the frequency of the programming signal is the same as the excitation signal, the embodiment shown in FIG. 8 suffices for programming.

Figure 10:
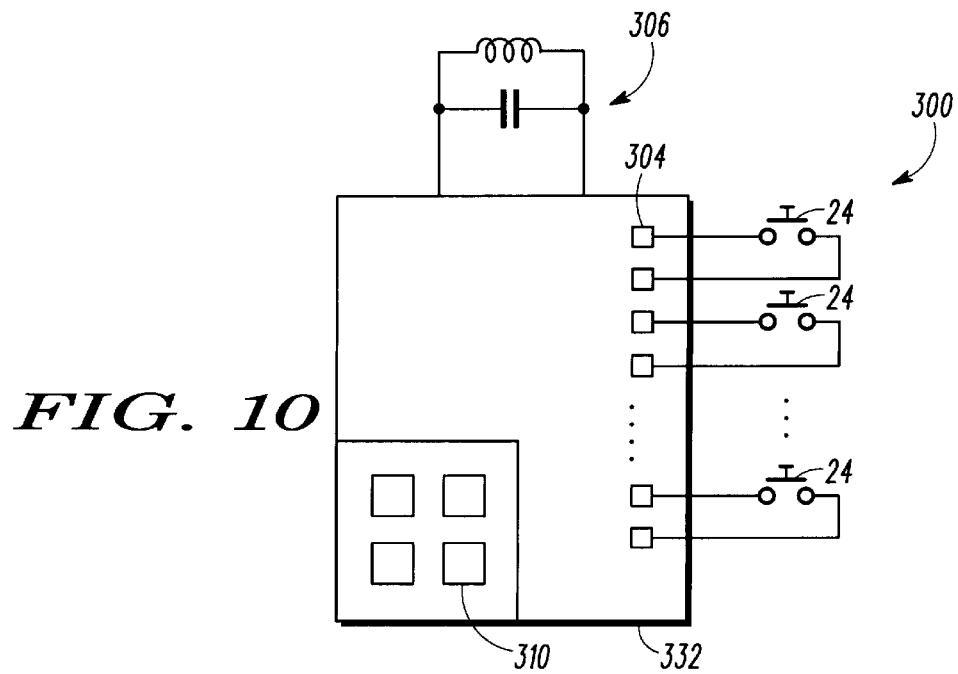
FIG. 10 is a schematic diagram illustrating an alternate preferred embodiment of a wireless keyboard in accordance with the present invention, wherein each keyboard key is coupled to a radio frequency identification circuit.

FIG. 10 is a schematic illustration of an alternate preferred embodiment of a wireless keyboard 300 in accordance with the present invention. Wireless keyboard 300 includes a plurality of keys 24, a radio frequency identification circuit 332, and an antenna 306. Each of the plurality of keys 24 is coupled to two pads on radio frequency identification circuit 332. More specifically, each key 24 completes or closes a circuit between the two connected pads when depressed or actuated. Radio frequency circuit 332 detects the completion of the circuit on the pads to determine if a key is depressed. A plurality of code storing circuits 310 are provided on radio frequency identification circuit 332 that are associated with the keys 24. Most preferably a code storing circuit 310 is associated with one of the keys 24. Radio frequency circuit 332 determines a response signal to be generated through antenna 306 in response to an excitation signal from an exciter/receiver. The response signal is determined by the key(s) 24 depressed and the code storing circuit associated therewith. Most preferably, each key represents a bit or digit in a response signal and whether that bit is in one state or another is determined by whether or not the key is depressed. This advantageously allows multiple keys to be depressed at the same time.

Figure 11:
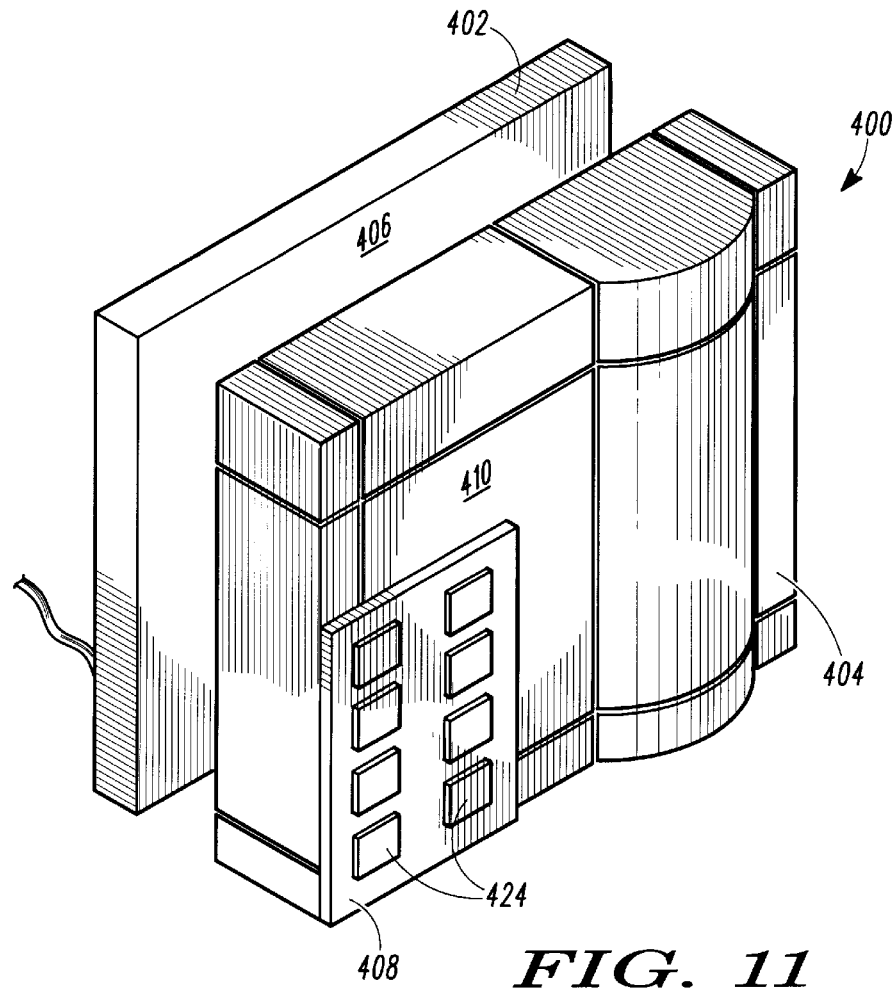
FIG. 11 is a perspective view of a radio frequency identification system including a wireless keyboard in accordance with the present invention.

FIG. 11 is a perspective view of a wireless keyboard system 400 in accordance with the present invention. Wireless keyboard system 400 includes an exciter/receiver 402 and an add-on keyboard assembly 404. Exciter/receiver 402 is preferably an existing exciter/receiver that is a part of a radio frequency identification system. Cable is used to couple or interface exciter/receiver 402 to an associated system, for example, a sentry system. Exciter/receiver 402 has a front or top surface 406.

Wireless keyboard assembly 404 includes a keypad 408 with a plurality of keys 424. Assembly 404 has a housing 410 that contains the circuitry for interfacing the keypad 408 to a radio frequency identification circuit. For example, housing 410 alternatively houses the circuits shown in FIGS. 7–10.

Most preferably, keyboard assembly 404 is affixed to a surface 406 of existing exciter/receiver 402. Of course, alternate configurations are possible, including encircling existing exciter/receiver 402 with housing 410, or mounting assembly 404 near or in proximity to exciter/receiver 402. By virtue of assembly 404 being remotely powered, no power wires needed to retrofit assembly 404 to the system that includes exciter/receiver 402. Also, since exciter/receiver 402 and assembly 404 communicate via radio frequency signals, no data wires are needed to facilitate communication between the two. Thus, a completely wireless coupling is accomplished. This facilitates addition of a keyboard in virtually any system, including a system that did not contemplate such an add-on. The ability to add a keyboard enhances the features of an existing radio frequency identification system that previously only detected the presence or absence of a valid tag. However, continued use with a tag is not prohibited or inhibited by the add-on keyboard.

Figure 12:
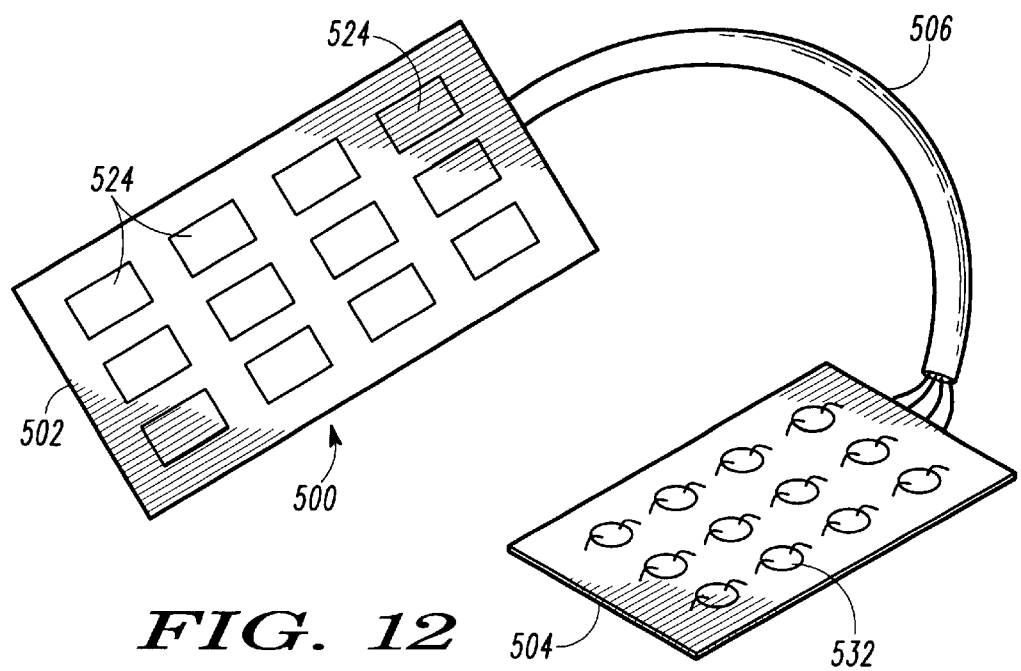
FIG. 12 is a schematic diagram of a physical configuration of a wireless keyboard in accordance with the present invention.

FIG. 12 shows schematically a physical configuration of a wireless keyboard 500 in accordance with the present invention. Wireless keyboard 500 includes a membrane keypad 502, a substrate 504 and a cable 506. Cable 506 electrically couples membrane keypad 502 to substrate 504. Membrane keypad 502 includes a plurality of keys 524, which are manually actuated. Substrate 504 has mounted thereon a plurality of radio frequency identification circuits 532 and an antenna. Preferably, substrate 504 is a printed circuit board with an antenna mounted on or embedded therein. Also, radio frequency identification circuits 532 are preferably die-bonded chips mounted on and coupled to the printed circuit board.

Figure 13:
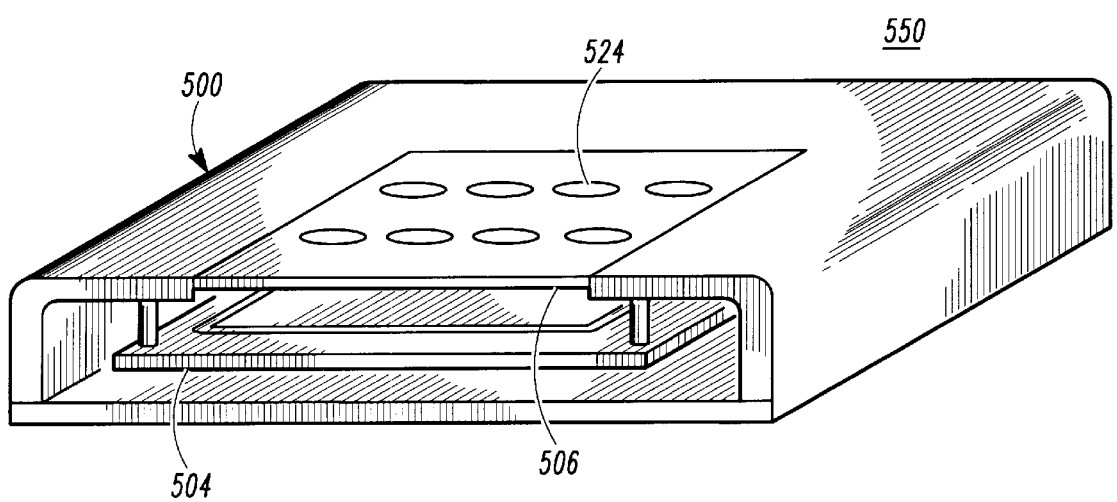
FIG. 13 is a perspective view illustrating an arrangement of a wireless keyboard in accordance with the present invention.

FIG. 13 illustrates a preferred housing and arrangement for wireless keyboard 500. As shown in FIG. 13, keypad 502 is mounted in a spaced relationship above substrate 504. A housing 550 covers the substrate 506. Cable 506 couples substrate 504 to keypad 502.

A wireless keyboard system and method in accordance with the present invention advantageously provides a passive keyboard to expand a radio frequency identification system. Since no power or data wires are required to operably couple the keyboard to an exciter/receiver, the wireless keyboard is readily retrofit or added to an existing radio frequency identification system, expanding the capabilities of the existing system.

The invention being thus described, it will be evident that the same may be varied in many ways. Such variations are not to be regarded as a departure from the spirit and scope of the invention and all such modifications are intended to be included within the scope of the claims.

We claim:

1. A wireless keyboard system comprising:
    an exciter/receiver that produces an excitation field generated by at least one of electrostatic and electromagnetic radiation;
    a keyboard in signal communication with the excitation field such that the keyboard is powered by the excitation field and produces a response signal;
    at least one manually actuated element on the keyboard, the at least one manually actuated element being coupled to at least one radio frequency identification circuit such that actuation of the at least one manually actuated element causes the keyboard to produce a predetermined response signal; and
    wherein the keyboard is mounted in a fixed position in proximity to the exciter/receiver.

2. The wireless keyboard system of claim 1, wherein the at least one manually actuated element comprises one of a numeric button, alphabetic button and alphanumeric button.

3. The wireless keyboard system of claim 1, wherein the exciter/receiver is part of a sentry system.

4. The wireless keyboard system of claim 1, wherein the at least one manually actuated element is at least one of a key, switch and button.

5. The wireless keyboard system of claim 1, wherein the excitation field has a frequency of 125 KHz.

6. The wireless keyboard system of claim 5, wherein the response signal has a frequency of 62.5 KHz.

7. The wireless keyboard system of claim 1 wherein the keyboard is mounted on a wall and the exciter/receiver is mounted near an opposite side of the wall.

8. The wireless keyboard system of claim 1 wherein the keyboard has a housing and the housing is configured to rest on a surface of the exciter/receiver.

9. The wireless keyboard system of claim 1, wherein the keyboard comprises:
    a first circuit that is capable of being in a closed circuit configuration and an open circuit configuration;
    at least one of an electrostatic antenna and an electromagnetic antenna; and
    at least one actuated element that is capable of placing the first circuit in the closed circuit configuration to couple the at least one of an electrostatic antenna and electromagnetic antenna to produce a pulse code signal.

10. The wireless keyboard system of claim 1, wherein the keyboard comprises:
    a first circuit that is capable of obtaining a closed circuit configuration and an open circuit configuration;
    at least one of an electrostatic antenna and an electromagnetic antenna;
    a code storing circuit that stores a code; and
    wherein the at least one manually actuated element is operable to place the first circuit in the closed circuit configuration and to couple the at least one of an electrostatic antenna and electromagnetic antenna to produce a pulse code signal corresponding to the code stored in the code storing circuit.

11. The wireless keyboard system of claim 1 wherein the at least one radio frequency identification circuit is a single radio frequency identification circuit comprising:
    a decoder coupled to the at least one manually actuated element to decode a depressed manually actuated element;
    control logic coupled to the decoder to determine a selected modulation based on the depressed manually actuated element; and
    a modulator coupled to the control logic to receive the selected modulation and provide a modulated signal to an antenna, the modulated signal being determined by the selected modulation.

12. The wireless keyboard system of claim 1 further comprising:
   a programmable decoder coupled to the at least one manually actuated element, wherein the programmable decoder selectively changes a code associated with the at least one manually actuated element in response to a programming signal.

13. The wireless keyboard system of claim 12 wherein the programming signal is received by a programming antenna.

14. The wireless keyboard system of claim 13 wherein the exciter/receiver includes an exciter antenna element and a receiver antenna element and the programming antenna is distinct from both the exciter antenna element and the receiver antenna element.

15. The wireless keyboard system of claim 14 wherein the programmable decoder comprises a microprocessor.

16. A wireless keyboard system comprising:
   an exciter/receiver that produces an excitation field generated by at least one of electrostatic and electromagnetic radiation;
   a keyboard in signal communication with the excitation field such that the keyboard is powered by the excitation field and produces a response signal;
   a plurality of manually actuated elements on the keyboard, each one of the plurality of manually actuated elements being coupled to one of a plurality of radio frequency identification circuits such that actuation of one of the plurality of manually actuated elements causes the keyboard to produce a predetermined response signal; and
   wherein the keyboard is in proximity to the exciter/receiver.

17. The wireless keyboard system of claim 16 wherein the keyboard further comprises:
   a first circuit that is capable of obtaining a closed circuit configuration and an open circuit configuration;
   at least one of an electrostatic antenna and an electromagnetic antenna;
   a code storing circuit that stores a code; and
   wherein one of the plurality of manually actuated elements is operable to place the first circuit in the closed configuration and to couple the at least one of an electrostatic antenna and electromagnetic antenna to produce a pulse code signal corresponding to the code stored in the code storing circuit.

18. The wireless keyboard system of claim 16 wherein the keyboard is mounted on a wall and the exciter/receiver is mounted adjacent an opposite side of the wall.

19. The wireless keyboard system of claim 16 wherein the keyboard is mounted in a housing and the housing is configured to rest on a surface of the exciter/receiver.

20. The wireless keyboard system of claim 16 wherein the keyboard is mounted on a wall and the exciter/receiver is mounted on the same side of the wall.

21. A method for retrofitting a wireless keyboard to an existing radio frequency identification system, the method comprising the steps of:
   a) affixing a keyboard near an existing exciter/receiver;
   b) powering the keyboard with an excitation field from the existing exciter/receiver, the excitation field being generated by one of electrostatic and electromagnetic radiation;
   c) generating a response signal with the keyboard, wherein the keyboard comprises:
      at least one radio frequency identification circuit; and
      a manually actuated element being coupled to the at least one radio frequency identification circuit such that actuation of the manually actuated element causes the keyboard to produce the response signal.

22. The method of claim 21 wherein the keyboard is mounted on a wall and the existing exciter/receiver is mounted adjacent an opposite side of the wall.

23. The method of claim 21 wherein the keyboard has a housing and the housing is configured to rest on a surface of the existing exciter/receiver.

24. The method of claim 21 wherein the keyboard is mounted on a wall and the existing exciter/receiver is mounted on a same side of the wall.

25. The method of claim 21 wherein the manually actuated element comprises one of a numeric button, alphabetic button and alphanumeric button.

* * * * *